United States Patent
Campanelli et al.

(10) Patent No.: US 8,705,134 B2
(45) Date of Patent: Apr. 22, 2014

(54) METHOD OF PROCESSING AN IMAGE TO CLARIFY TEXT IN THE IMAGE

(76) Inventors: Michael Robert Campanelli, Webster, NY (US); John C. Handley, Fairport, NY (US); Dennis L. Venable, Marion, NY (US)

(*) Notice: Subject to any disclaimer, the term of this patent is extended or adjusted under 35 U.S.C. 154(b) by 648 days.

(21) Appl. No.: 13/013,890

(22) Filed: Jan. 26, 2011

(65) Prior Publication Data

US 2012/0188612 A1 Jul. 26, 2012

(51) Int. Cl.
*H04N 1/40* (2006.01)
*G06K 15/00* (2006.01)

(52) U.S. Cl.
USPC .......... 358/3.22; 358/3.24; 358/453; 358/463; 358/462; 358/448; 382/164; 382/167; 382/260; 382/261; 382/262

(58) Field of Classification Search
None
See application file for complete search history.

(56) References Cited

U.S. PATENT DOCUMENTS

| 6,922,487 B2 | 7/2005 | Dance et al. |
| 7,565,027 B2* | 7/2009 | Mantell ................... 382/274 |
| 2007/0092138 A1* | 4/2007 | Tseng ...................... 382/169 |

OTHER PUBLICATIONS

Ye et al., "Stroke-Model-Based Character Extraction from Gray-Level Document Images," IEEE Transactions on Image Processing, Aug. 2001, pp. 1152-1161, vol. 10, No. 8.
Sezgin et al., "Survey over image thresholding techniques and quantitative performance evaluation," Journal of Electronic Imaging 13(01), Jan. 2004, pp. 146-155.
Solihin et al., "Integral Ration: A New Class of Global Thresholding Techniques for Handwriting Images," IEEE Transactions on Pattern Analysis and Machine Intelligence, Aug. 1999, vol. 21, No. 8.

* cited by examiner

*Primary Examiner* — David K. Moore
*Assistant Examiner* — Quang N Vo

(57) ABSTRACT

An image file representing at least a portion of a printed document is processed to highlight the differences between foreground material (e.g., text or other characters) from background. The method includes selecting a neighborhood of pixels, determining a weighted average of an attribute values (e.g., luminance) for each pixel, and modifying each pixel's value based on the weighted average. Graylevel scaling, error diffusion, and a bit level conversion are also performed each pixel ends up with either a first attribute value level (e.g., luminance of 0) or a second attribute value level (e.g., luminance of 255).

20 Claims, 4 Drawing Sheets

| 0 | 0 | 39 | 10 | 10 | 40 | 50 | 20 | 10 | 0 |
| 0 | 42 | 45 | 20 | 30 | 50 | 200 | 35 | 5 | 0 |
| 0 | 30 | 30 | 45 | 80 | 200 | 50 | 30 | 5 | 0 |
| 0 | 30 | 20 | 30 | 180 | 100 | 60 | 20 | 0 | 0 |
| 0 | 23 | 20 | 95 | 50 | 244 | 80 | 30 | 0 | 0 |
| 0 | 20 | 45 | 20 | 25 | 100 | 255 | 30 | 0 | 0 |
| 10 | 15 | 20 | 15 | 15 | 30 | 60 | 40 | 0 | 0 |
| 10 | 15 | 0 | 0 | 0 | 5 | 10 | 5 | 0 | 0 |

*FIG. 1*

|   |   |   |   |   |   |   |   |   |   |
|---|---|---|---|---|---|---|---|---|---|
|   |   |   |   |   |   |   |   |   |   |
|   |   |   |   |   |   |   |   |   |   |
|   |   |   |   | 80 | 200 | 50 |   |   |   |
|   |   |   |   | 180 | 100 | 60 |   |   |   |
|   |   |   |   | 50 | 244 | 80 |   |   |   |
|   |   |   |   |   |   |   |   |   |   |
|   |   |   |   |   |   |   |   |   |   |
|   |   |   |   |   |   |   |   |   |   |

*FIG. 3*

|   |   |   |   |   |   |   |   |   |   |
|---|---|---|---|---|---|---|---|---|---|
|   |   |   |   |   |   |   |   |   |   |
|   |   |   |   |   |   |   |   |   |   |
|   |   |   |   | 50 | 205 | 50 |   |   |   |
|   |   |   |   | 205 | 100 | 50 |   |   |   |
|   |   |   |   | 50 | 255 | 50 |   |   |   |
|   |   |   |   |   |   |   |   |   |   |
|   |   |   |   |   |   |   |   |   |   |
|   |   |   |   |   |   |   |   |   |   |

*FIG. 4*

| 0 | 0 | 0 | 0 | 0 | 0 | 0 | 0 | 0 | 0 |
|---|---|---|---|---|---|---|---|---|---|
| 0 | 0 | 255 | 0 | 0 | 0 | 255 | 0 | 0 | 0 |
| 0 | 0 | 0 | 255 | 0 | 255 | 00 | 0 | 0 | 0 |
| 0 | 0 | 0 | 0 | 255 | 0 | 0 | 0 | 0 | 0 |
| 0 | 0 | 0 | 255 | 0 | 255 | 0 | 0 | 0 | 0 |
| 0 | 0 | 255 | 0 | 0 | 0 | 255 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

*FIG. 5*

METHOD OF PROCESSING AN IMAGE TO CLARIFY TEXT IN THE IMAGE

BACKGROUND

The present disclosure relates to image processing methods and systems.

Many small electronic devices are now equipped with cameras. Mobile phones, personal digital assistants, tablet devices, and other communication devices are commonly used to capture images, as well as to quickly send the image via electronic mail, text message, or another delivery method to a remote location. At times, such devices may be used to photograph a document. The device user may either send the document to a third party as an image file for review, or the user may save the image file for later viewing.

Although the proliferation of such devices increases users' ability to capture document images, the image quality that can result from a multifunctional electronic device often is not as high as the image quality of a dedicated camera. In addition, the images are typically not captured under conditions that are ideal for photographing fine details. Thus, text can be blurry, not entirely captured, obscured, or otherwise unclear so that it is difficult for a person to read text that is captured in the image. Light variability, shadowing, and other variables can create an environment that may even challenge a dedicated camera to capture a clear image of text in a document.

The disclosure presented below describes attempts to solve at least some of the problems described above.

SUMMARY

In one general respect, the embodiments disclose a method of processing an image. The method includes accessing, by a processing device, an image file containing data representing an image of at least a portion of a printed document. Optionally, if the image is a color image, the method may include converting the data to data representing a grayscale image. The method includes selecting a neighborhood of adjacent pixels, wherein at least a portion of the pixels in the neighborhood are associated with raster content in the image. Each pixel in the neighborhood has a luminance value or other attribute value. The method determines a weighted average of the attribute values for the pixels in the neighborhood, and it modifies the attribute values of at least some of the pixels in the neighborhood in accordance with the weighted average. Graylevel scaling is applied to the pixels in the neighborhood to determine whether any pixel should be classified as an end range pixel. For each classified end range pixel whose attribute value does not equal an end range level, the method modifies the attribute value of that pixel to be scaled to a full data range of the attribute values. The method also includes applying error diffusion (such as Floyd-Steinberg error diffusion) to the pixels in the neighborhood to distribute the neighboring pixels over a range of attribute value levels, such as a range of from 3 levels to 64 levels, or a range of 4 to 8 levels. The method includes performing a bit level conversion to the pixels in the neighborhood so that each pixel having an attribute value that is below a midpoint is assigned a first attribute value level, while each pixel having an attribute value above the midpoint is assigned a second attribute value level. This yields a modified image, which as saved as a modified image file.

Optionally, and using luminance as the exemplary attribute value, in the above embodiment, the graylevel scaling may include identifying (i) a pixel set that includes the pixels in the neighborhood and (ii) a plurality of pixels that are adjacent to the pixels in the neighborhood. It also may include identifying an upper group of pixels in the pixel set that exhibit a luminance equal to or above an upper threshold and determining a value (avgmax) equal to the average luminance of the upper group pixels. It also may include identifying a lower group of pixels in the pixel set that exhibit a luminance equal to or below a lower threshold and determining a value (avgmin) equal to the average luminance of the lower group pixels. The method may include determining a standard deviation (such as a percentage standard deviation) for the luminance levels of the pixels in the pixel set, and also determining whether the standard deviation is greater than a difference between avgmax and avgmin. If the standard deviation is greater than a difference between avgmax and avgmin, then the luminance level of each pixel in the upper group may be modified to an upper end range level, and the luminance level of each pixel in the lower group may be modified to a lower end range level.

In any of the above embodiments, determining the weighted average may include applying a filter to the pixels in the neighborhood. After performing the bit level conversion, the method may include despeckling the pixels in the modified image file to remove discrete pixel noise. The method also may include: (i) selecting one or more additional neighborhoods; (ii) performing the weighted average determination, graylevel scaling, error diffusion, and bit level conversion for each of the additional neighborhoods; and (iii) despeckling the pixels in the modified image file to remove discrete pixel noise. It also may include: (a) performing optical character recognition on the modified image file; (b) determining a number of errors in the characters processed in the optical character recognition; and (c) in response to the number of errors exceeding a threshold, prompting a user to re-capture the image.

Any or all of the actions described above may be performed by a processor. A processor-readable storage medium that is in communication with the processor may contain one or more programming instructions that, when executed, cause the processor to perform such actions.

BRIEF DESCRIPTION OF THE DRAWINGS

FIG. 1 illustrates an exemplary matrix of pixels associates with an image, with luminance levels for each pixel.

FIG. 3 illustrates an exemplary neighborhood of pixels and their corresponding luminance levels.

FIG. 4 illustrates an exemplary neighborhood after error diffusion.

FIG. 5 illustrates the matrix of FIG. 1 after image processing.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

An "image" or "image file" as used in this document refers to a digital representation of an image of a document that has been obtained by a camera or other image capture device. The image may include text, graphics, or other similar markings or distinguishing features.

A digital image includes a matrix of discrete picture elements, or pixels. Each pixel has one or more associated numerical attribute values, and the digital file will contain data that reflects a variety of attributes for each pixel. One data point that the file may include for each pixel is a measurement of luminance, which characterizes the visually perceived brightness of the pixel. For example, a JPEG data file may store pixel data in accordance with a YCbCr color space, where the Y represents a measurement of the attribute value of luminance.

Luminance levels may vary based on a predetermined scale. For example, in a grayscale 8-bit digital image, pixels may have luminance levels that range from zero to 255, where zero represents the least luminance (i.e., black), and 255 represents the most luminance (i.e., white). In such a system, luminance levels between zero and 255 represent various shades of gray. Alternatively, luminance levels may be based on a percentage, with 0% representing black and 100% representing white. Other ranges are possible. The image file may characterize such a data point as a brightness level or gray level rather than a luminance level. Accordingly, the terms "brightness level," "luminance level" or "gray level" may be considered equivalent to each other for the purpose of this disclosure.

FIG. 1 illustrates an exemplary pixel matrix with luminance levels represented on a scale of zero to 255. In this example, the image may be of a white letter "x" on a black background (with the pixels forming the "x" shown in bold type in FIG. 1). However, the data shown in FIG. 1 shows that the image is blurred, as not all elements of the "x" have a luminance of 255, and not all elements of the "x" have a luminance level of zero.

Figure 2:
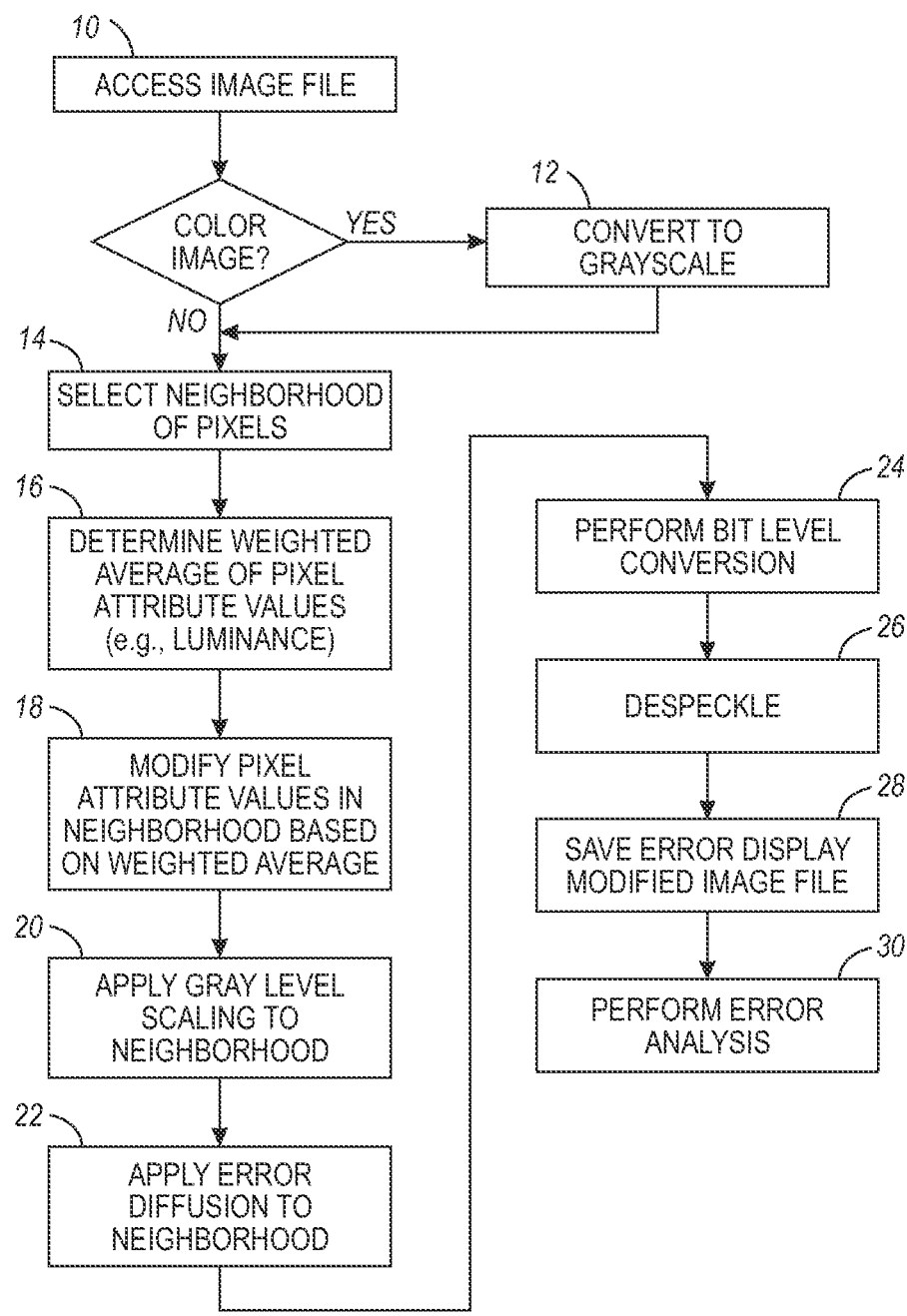
FIG. 2 illustrates steps that a processor may perform in accordance with the embodiments described herein.

In embodiments described in this document, an image file containing data such as that shown in FIG. 1 may be processed in a manner that uses error diffusion to sharpen the image and distinguish certain raster content, such as text, from background. In such a method, as illustrated in FIG. 2, a processor may access an image file 10 by retrieving the file from a computer-readable memory or by receiving it via an input port. The image file contains data that represents an image containing text (letters, numbers, punctuation, and/or similar characters), and the file may be in any format having pixels, including but not limited to bitmap (.bmp), JPEG (.jpg), TIFF (.tif), PNG (.png), or other raster formats. The image file includes data for a matrix of pixels that make up the image. The file includes a luminance level for each pixel, or values that can derive a luminance, along with other optional data points.

Optionally, if the image file is of a color image, the processor may first convert the file to represent a gray image 12. This conversion may be done by any now or hereafter known luminance-based or absolute gray scaling technique. Alternatively, the processor may derive pixel luminance values from RGB formatted data. In this case, a percentage value of R, G, and B are combined to create a luminance value for each pixel.

The processor is programmed with instructions that cause the processor to select a neighborhood 14 of adjacent pixels for the image. At least a portion of the pixels in the neighborhood will, when displayed, display a portion of text, such that the pixels include one or more characters in the image. For example, as shown in FIG. 3, an exemplary 3×3 pixel neighborhood may center on the pixel shown as having a luminance of 100, along with its eight neighboring pixels so that they collectively form a 3×3 matrix. The shown neighborhood size (3×3) is exemplary, and other neighborhood sizes (such as 5×5 or 9×9) may be used. In addition, the neighborhood does not need to be square. The width and height may vary, and neither must be limited in size.

Referring again to FIG. 2, the processor may determine a weighted average 16 of the luminance levels for the pixels in the neighborhood. Then, it may modify the luminance level 18 of one or more of the pixels in the neighborhood in accordance with the weighted average. For example, the weighted average determination may include using a Gaussian filter, or another smoothing filter, to smooth noise in the luminance levels and bring neighboring pixels that exhibit similar—but not identical—luminance closer together.

The processor may then apply gray level thresholding and gray level scaling 20, to the pixels in the neighborhood to identify pixels that should be classified as an end range pixel. As used in this disclosure, and using the attribute value of luminance as an example, an end range pixel is that which has a luminance that is no more than a predetermined amount away from the upper end of the luminance range or the lower end of the luminance range. For each classified end range pixel whose luminance does not equal the extreme of the range (e.g. black or white), the processor may modify the luminance of that pixel to equal applicable the end range level. For example, in a 0-255 luminance level system an upper end range pixel may be one having a luminance level that is no more than 10% below 255 (i.e., no less than 229.5), while a lower end range pixel may be one having a luminance level that is no more than 10% above zero (i.e., no more than 25.5). The processor may then modify the luminance levels of all pixels that are not an end range pixel to be scaled to the full gray level ranges represented from 0 to 255.

Within the pixel neighborhood, a determination may be made for the average minimum (avgmin) and average maximum (avgmax) luminance values. The processor may identify a first group of pixels in the neighborhood that have luminance values above an upper threshold, as well as a second group of pixels that have luminance values below a lower threshold. Optionally, avgmax may be the average value of the upper (first) group, while avgmin may be the average of the lower (second) group. The processor may determine a standard deviation (such as a percentage deviation) for the luminance levels of the pixels in the neighborhood. If the standard deviation is greater than the difference between avgmin and avgmax, the processor may modify the luminance value of each pixel in the upper group to an upper range level, as well as the luminance value of each pixel in the lower group to the lower range level. These values, along with the pixel in question, may be used to modify the luminance proportionally so as to create a new gray scaled luminance value for the current pixel being operated on. For example, if the average minimum luminance value is 56 and the average maximum luminance value is 200, and the current pixel to be operated on has a luminance value of 120, gray scaling would increase the 120 to 153. This may be derived as follows: (current pixel luminance level divided by avgmin) divided by (avgmax divided by avgmin) times the full range of 255 levels. These values indicate pixels that are not threshold capable within the local neighborhood range. After this processing, the raster image will contain pixels modified by thresholding and gray level scaling.

Next, the processor may apply error diffusion 22 to the pixels in the neighborhood to distribute the pixels in the neighborhood over a limited number or range of luminance levels. The range may be 4 levels, from 4 levels to 8 levels, from 3 levels to 64 levels, or any suitable number that is greater than two levels. Error diffusion may be done only to the pixels in the neighborhood, or optionally to a set of pixels that includes the neighborhood as well as a group of pixels adjacent the neighborhood. Optionally and in various embodiments, by default error diffusion may be applied to the entire image.

In an embodiment, referring to FIG. 4, error diffusion techniques may include those described in R. W. Floyd & L. Steinberg, "An Adaptive Algorithm for Spatial Grayscale," in the Proceedings of the Society for Information Display, Vol. 17, pp. 75-77 (1976) (generally known as Floyd-Steinberg error diffusion). Other methods, such as level distribution or those described in U.S. Pat. No. 7,565,027 to Mantell, the disclosure of which is incorporated herein by reference, may be used.

In FIG. 4, the error diffusion technique distributes the pixels across six luminance levels of 0, 50, 100, 155, 205, and 255. For example, the technique may determine whether each pixel's luminance is with a threshold amount up, down, or either up or down from each level, and if so modifying the luminance of the pixel to match that level. The threshold amounts may vary by level, and they may be limited to a single direction (i.e., up or down) for each level. An exemplary result of such a technique for the neighborhood of FIG. 3 is shown in FIG. 4.

Returning to FIG. 2, the processor may also perform a bit level conversion 24 to the pixels in the neighborhood so that each pixel having a luminance that is below a midpoint level (i.e., 50% on a 0%-100% scale, or 128 on a 0-255 scale) is assigned a first luminance level and each pixel having a luminance that is above the midpoint is assigned a second luminance level to yield a modified image, Optionally, the first luminance level may be the lowest level in the range (i.e., zero) so that the relevant pixels are modified to become black, while the second luminance level may be the highest level in the range (i.e., 255 or 100%) so that the relevant pixels are modified to become white. However, alternate levels may be used so that the resulting image is made of pixels primarily having one or two distinct luminance levels, thus allowing for visual distinction of foreground from background.

The methods described above may be repeated for multiple neighborhoods so that the entire (or substantially all of) the image is processed. The system may select a neighborhood centered around each pixel in the image, or for at least a threshold number of pixels. The resulting luminance matrix for the example of FIG. 1 is shown in FIG. 5.

Returning to FIG. 2, optionally, the resulting image may be despeckled 26 to remove discrete pixel "noise." This may be down using any now or hereafter known despeckling technique, such as those described in U.S. Pat. No. 6,549,680 to Revankar, the disclosure of which is hereby incorporated by reference.

The processor may then save the modified image as a modified image file 28, and it may cause the modified image to be displayed on a display device.

Optionally, the processor may analyze the image to determine whether it detects any errors 30. For example, the processor may use any now or hereafter known optical character recognition method to analyze the modified image file and determine whether any errors are present in the image. Errors may include, for example, letters that are not fully formed or improperly formed, stray markings, unrecognizable characters, and/or the like. If the number of detected errors exceeds a threshold, the system may display the modified image to the user and/or ask or prompt the user to re-scan the image so that it may be re-processed as a new image file.

Figure 6:
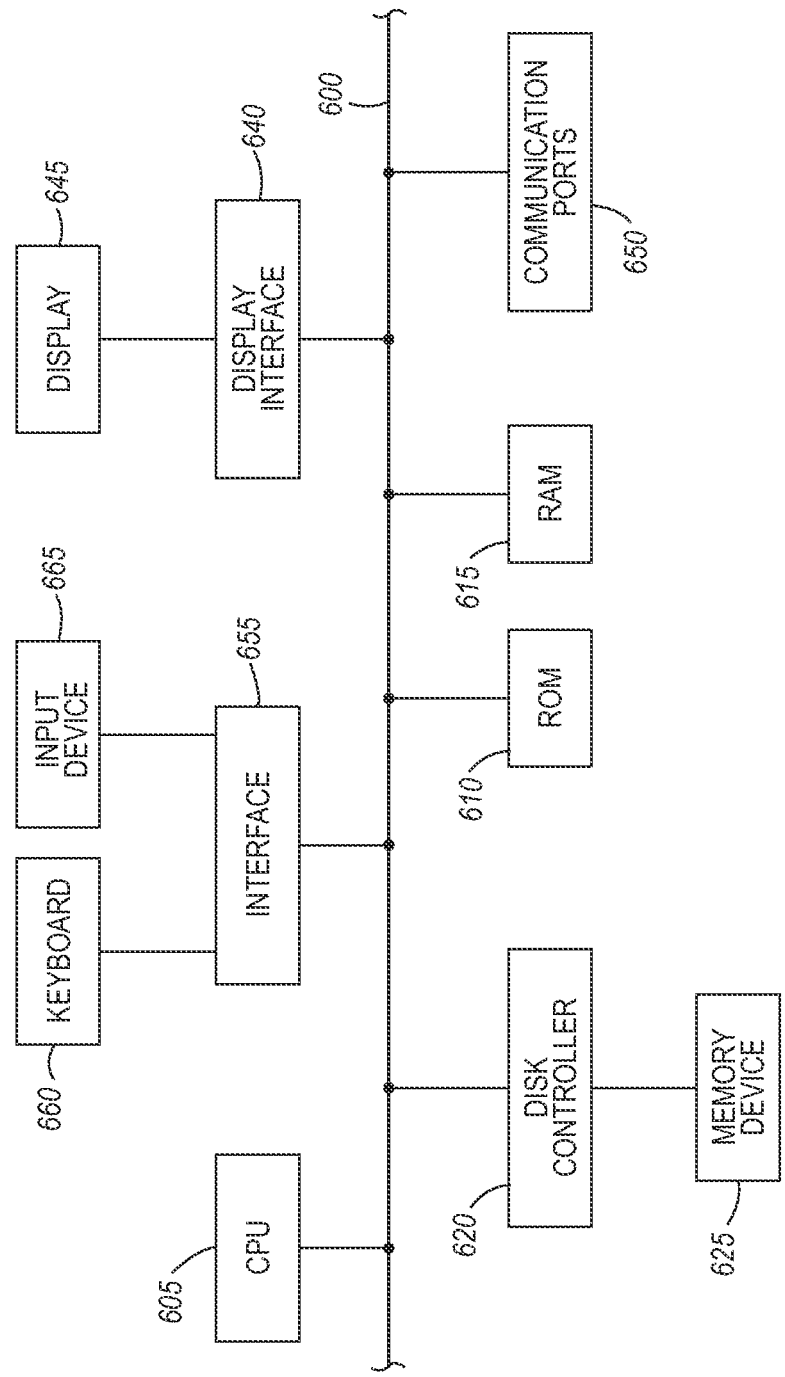
FIG. 6 illustrates various embodiments of an exemplary computing device for implementing various methods and processes described herein.

FIG. 6 depicts a block diagram of exemplary internal hardware that may be used to contain or implement the various systems discussed above, as well as to perform the processes described above. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an exemplary processing device, computing device or processor as such terms are used within this disclosure. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the processes discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. Communication with external devices may occur using various communication ports 650. An exemplary communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:
1. A method of processing an image, comprising:
   accessing, by a processing device, an image file containing data representing an image of at least a portion of a printed document;
   selecting a neighborhood of adjacent pixels, wherein at least a portion of the pixels in the neighborhood are associated with raster content in the image and each pixel in the neighborhood has an attribute value;

determining a weighted average of the attribute values for the pixels in the neighborhood, and modifying the attribute values of at least some of the pixels in the neighborhood in accordance with the weighted average;

applying graylevel scaling to the pixels in the neighborhood to determine whether any pixel should be classified as an end range pixel, and for each classified end range pixel whose attribute value does not equal an end range level, modifying the attribute value of that pixel to be scaled to a full data range of the attribute values;

applying error diffusion to the pixels in the neighborhood to distribute the neighboring pixels over a range of attribute value levels, wherein the range is from 3 levels to 64 levels;

performing a bit level conversion to the pixels in the neighborhood so that each pixel having an attribute value that is below a midpoint is assigned a first attribute value level and each pixel having an attribute value above the midpoint is assigned a second attribute value level to yield a modified image; and saving the modified image as a modified image file.

2. The method of claim 1, wherein the attribute value comprises a luminance level, and the graylevel scaling comprises:

identifying a pixel set comprising the pixels in the neighborhood and a plurality of pixels that are adjacent to the pixels in the neighborhood;

identifying an upper group of pixels in the pixel set that exhibit a luminance equal to or above an upper threshold and determining a value (avgmax) equal to the average luminance of the upper group pixels;

identifying a lower group of pixels in the pixel set that exhibit a luminance equal to or below a lower threshold and determining a value (avgmin) equal to the average luminance of the lower group pixels;

determining a standard deviation for the luminance levels of the pixels in the pixel set, and also determining whether the standard deviation is greater than a difference between avgmax and avgmin;

if the standard deviation is greater than a difference between avgmax and avgmin, then modifying the luminance level of each pixel in the upper group to an upper end range level and modifying the luminance level of each pixel in the lower group to a lower end range level.

3. The method of claim 1, wherein determining the weighted average comprises applying a filter to the pixels in the neighborhood.

4. The method of claim 1 further comprising, before the extracting:

if the image is a color image, converting the data to data representing a grayscale image.

5. The method of claim 1 wherein the range is from 4 to 8 levels.

6. The method of claim 1, wherein the error diffusion comprises Floyd-Steinberg error diffusion.

7. The method of claim 1, further comprising, after performing the bit level conversion, despeckling the pixels in the modified image file to remove discrete pixel noise.

8. The method of claim 1, further comprising:
selecting a plurality of additional neighborhoods;
performing the weighted average determination, graylevel scaling, error diffusion, and bit level conversion for each of the additional neighborhoods; and
despeckling the pixels in the modified image file to remove discrete pixel noise.

9. The method of claim 1, further comprising:
performing optical character recognition on the modified image file;
determining a number of errors in the characters processed in the optical character recognition; and
in response to the number of errors exceeding a threshold, prompting a user to re-capture the image.

10. A method of processing an image, comprising:
accessing, by a processing device, an image file containing data representing an image of at least a portion of a printed document;
in response to determining that the image is a color image, converting the data so that it represents a grayscale image;
selecting a neighborhood of adjacent pixels, wherein at least a portion of the pixels in the neighborhood are associated with raster content in the image and each pixel in the neighborhood has a luminance value;
using a filter to determine a weighted average of the attribute value for the pixels in the neighborhood, and modifying the luminance value of at least some of the pixels in the neighborhood in accordance with the weighted average;
applying graylevel scaling to the pixels in the neighborhood to determine whether any pixel should be classified as an end range pixel, and for each classified end range pixel whose luminance does not equal an end range level, modifying the luminance value of that pixel to be scaled to a full data range of the luminance values;
applying error diffusion to the pixels in the neighborhood to distribute the neighboring pixels over a range of attribute value levels, wherein the range is from 3 levels to 64 levels;
performing a bit level conversion to the pixels in the neighborhood so that each pixel having a luminance value that is below a midpoint is assigned a first attribute value level and each pixel having a luminance value above the midpoint is assigned a second luminance value level to yield a modified image; and
saving the modified image as a modified image file.

11. The method of claim 10, wherein the graylevel scaling comprises:
identifying a pixel set comprising the pixels in the neighborhood and a plurality of pixels that are adjacent to the pixels in the neighborhood;
identifying an upper group of pixels in the pixel set that exhibit a luminance equal to or above an upper threshold and determining a value (avgmax) equal to the average luminance of the upper group pixels;
identifying a lower group of pixels in the pixel set that exhibit a luminance equal to or below a lower threshold and determining a value (avgmin) equal to the average luminance of the lower group pixels;
determining a standard deviation for the luminance levels of the pixels in the pixel set, and also determining whether the standard deviation is greater than a difference between avgmax and avgmin;
if the standard deviation is greater than a difference between avgmax and avgmin, then modifying the luminance level of each pixel in the upper group to an upper end range level and modifying the luminance level of each pixel in the lower group to a lower end range level.

12. The method of claim 10, wherein the error diffusion comprises Floyd-Steinberg error diffusion.

13. The method of claim 10, further comprising, after performing the bit level conversion, despeckling the pixels in the modified image file to remove discrete pixel noise.

14. The method of claim 10, further comprising:
selecting a plurality of additional neighborhoods;
performing the weighted average determination, graylevel scaling, error diffusion, and bit level conversion for each of the additional neighborhoods; and
despeckling the pixels in the modified image file to remove discrete pixel noise.

15. The method of claim 10, further comprising:
performing optical character recognition on the modified image file;
determining a number of errors in the characters processed in the optical character recognition; and
in response to the number of errors exceeding a threshold, prompting a user to re-capture the image.

16. An image processing system, comprising:
a processor; and
a processor-readable storage medium in communication with the processor,
wherein the processor-readable storage medium contains one or more programming instructions that, when executed, cause the processor to:
  access an image file containing data representing an image of at least a portion of a printed document;
  select a neighborhood of adjacent pixels, wherein at least a portion of the pixels in the neighborhood are associated with raster content in the image and each pixel in the neighborhood has an attribute value;
  determine a weighted average of the attribute value for the pixels in the neighborhood;
  modify the attribute value of at least some of the pixels in the neighborhood in accordance with the weighted average;
  apply graylevel scaling to the pixels in the neighborhood to determine whether any pixel should be classified as an end range pixel, and for each classified end range pixel whose luminance does not equal an end range level, modify the attribute value of that pixel to be scaled to a full data range of the attribute values;
  apply error diffusion to the pixels in the neighborhood to distribute the neighboring pixels over a range of attribute value levels;
  perform a bit level conversion to the pixels in the neighborhood so that each pixel having an attribute value that is below a midpoint is assigned a first attribute value level and each pixel having an attribute value above the midpoint is assigned a second attribute value level to yield a modified image; and
  save the modified image as a modified image file.

17. The system of claim 16, wherein the attribute value comprises a luminance level, and the instructions that cause the processor to perform graylevel scaling comprise instructions that cause the processor to:
  identify a pixel set comprising the pixels in the neighborhood and a plurality of pixels that are adjacent to the pixels in the neighborhood;
  identify an upper group of pixels in the pixel set that exhibit a luminance equal to or above an upper threshold and determining a value (avgmax) equal to the average luminance of the upper group pixels;
  identify a lower group of pixels in the pixel set that exhibit a luminance equal to or below a lower threshold and determining a value (avgmin) equal to the average luminance of the lower group pixels;
  determine a standard deviation for the luminance levels of the pixels in the pixel set, and also determine whether the standard deviation is greater than a difference between avgmax and avgmin;
  if the standard deviation is greater than a difference between avgmax and avgmin, then modify the luminance level of each pixel in the upper group to an upper end range level and modify the luminance level of each pixel in the lower group to a lower end range level.

18. The system of claim 16 wherein the instructions, when executed, also cause the processor to:
  determine whether the image is a color image, and
  convert color image data to data representing a grayscale image.

19. The system of claim 16 wherein the instructions, when executed, also cause the processor to, after performing the bit level conversion, despeckle the pixels in the modified image file to remove discrete pixel noise.

20. The system of claim 16 wherein the instructions, when executed, also cause the processor to:
  select a plurality of additional neighborhoods;
  perform the weighted average determination, graylevel scaling, error diffusion, and bit level conversion for each of the additional neighborhoods; and
  despeckle the pixels in the modified image file to remove discrete pixel noise.

* * * * *